US 6,568,816 B2

(12) United States Patent
Mayer, III et al.

(10) Patent No.: US 6,568,816 B2
(45) Date of Patent: May 27, 2003

(54) PROJECTION SYSTEM AND METHOD FOR USING A SINGLE LIGHT SOURCE TO GENERATE MULTIPLE IMAGES TO BE EDGE BLENDED FOR ARRAYED OR TILED DISPLAY

(75) Inventors: Theodore Mayer, III, Valley Village, CA (US); Lawrence S. Paul, Encino, CA (US); Todd Chaney, Burbank, CA (US)

(73) Assignee: Panoram Technologies, Inc., Sun Valley, CA (US)

( * ) Notice: Subject to any disclaimer, the term of this patent is extended or adjusted under 35 U.S.C. 154(b) by 0 days.

(21) Appl. No.: 09/968,507

(22) Filed: Oct. 1, 2001

(65) Prior Publication Data
US 2002/0067439 A1 Jun. 6, 2002

Related U.S. Application Data
(60) Provisional application No. 60/238,199, filed on Oct. 4, 2000.

(51) Int. Cl.[7] .................. G03B 21/26; G03B 21/00; G03B 21/14; H04N 9/12; G09G 5/00
(52) U.S. Cl. ............. 353/94; 353/31; 353/34; 353/37; 353/82; 353/121; 348/383; 348/739; 348/744; 349/5; 349/6; 349/7; 345/1.3; 345/4
(58) Field of Search ................ 353/69, 70, 94, 353/20, 31, 34, 37, 60, 61, 82, 121; 348/383, 739, 744, 745, 746, 747, 748; 345/1.3, 4; 349/9, 5, 6, 8

(56) References Cited
U.S. PATENT DOCUMENTS

| 4,974,073 | A | | 11/1990 | Inova | 358/87 |
|---|---|---|---|---|---|
| 5,136,390 | A | | 8/1992 | Inova et al. | 358/231 |
| 5,675,380 | A | * | 10/1997 | Florent et al. | 348/251 |
| 5,771,072 | A | * | 6/1998 | Tokoro et al. | 348/383 |
| 6,115,022 | A | | 9/2000 | Mayer, III et al. | 345/112 |
| 6,219,011 | B1 | * | 4/2001 | Aloni et al. | 345/1 |
| 6,219,099 | B1 | * | 4/2001 | Johnson et al. | 348/383 |
| 6,222,593 | B1 | | 4/2001 | Higurashi et al. | 348/745 |
| 6,254,239 | B1 | * | 7/2001 | Hibner, II et al. | 353/94 |
| 6,309,072 | B1 | * | 10/2001 | Deter | 353/31 |
| 6,337,724 | B1 | * | 1/2002 | Itoh et al. | 349/75 |
| 6,377,306 | B1 | * | 4/2002 | Johnson et al. | 348/383 |
| 6,418,267 | B1 | * | 7/2002 | Lowry | 385/147 |
| 2002/0057361 | A1 | * | 5/2002 | Mayer, III et al. | 348/383 |

* cited by examiner

Primary Examiner—Russell Adams
Assistant Examiner—Melissa J Koval
(74) Attorney, Agent, or Firm—Christie, Parker & Hale, LLP

(57) ABSTRACT

A projection system includes multiple imaging heads for projecting a plurality of images, which may or may not be partially overlapped and edge blended to form a projected composite image. The projection system, however, includes only a single light source. The light from the light source is beam split into light portions, and the light portions are applied to the imaging heads via corresponding light guides. Use of the single light source to project all the images may solve colorimetry problems associated with generating projected composite image from multiple projected images, each of which uses a different light source. For projecting the images on a curved surface, the geometry of the images may be distorted using electronic image warping and/or lens-based optical distortion.

30 Claims, 9 Drawing Sheets

PROJECTION SYSTEM AND METHOD FOR USING A SINGLE LIGHT SOURCE TO GENERATE MULTIPLE IMAGES TO BE EDGE BLENDED FOR ARRAYED OR TILED DISPLAY

CROSS-REFERENCE TO RELATED APPLICATION(S)

The present application claims priority of the U.S. Provisional Application No. 60/238,199 filed Oct. 4, 2000 entitled "Improved Projection System for Arrayed or Tiled Displays," the contents of which are fully incorporated by reference herein. The present application includes subject matter related to the subject matter disclosed in U.S. patent application Ser. No. 09/876,513 entitled "Method and Apparatus for Seamless Integration of Multiple Video Projectors" filed Jun. 6, 2001, the contents of which are fully incorporated by reference herein.

FIELD OF THE INVENTION

The present invention is related to displaying a composite image using multiple projected images, and particularly to method and apparatus for projecting multiple images using a single light source.

BACKGROUND OF THE INVENTION

Seamless integration of images from multiple projectors has many applications in the simulation, visualization and virtual reality (VR) fields. The images are typically generated by computers, specialty cameras, or specially prepared media (e.g., multi-channel image generators). Recently, use of such technology has become widespread in various industries and government applications including, without limitation, training and simulation, oil/gas, automotive, aerospace, education, as well as command and control.

Pre-formatted output of a multi-channel image generator is typically sent to several video projectors that are carefully arranged and aligned to a geometry that precisely matches the output format of the generators. In order for this arrayed display to create an image that appears perfectly contiguous, a number of factors should generally be managed:

1) The geometry and alignment of the projectors should typically be precisely matched with the output geometry of the multi-channel image generator;

2) The color balance of the multiple projectors should typically be precisely matched so that the images from these projectors have matching color balances; and 3) Adjacent images should typically be edge blended to generate a seamless projected composite image.

A method typically used to generate a seamless composite image from multiple projectors is to overlap a portion of the images and then using smoothing, correction or ramping factors on each side of the overlap, to blend the brightness of the overlapping images together so that they appear uniform. The correction or smoothing factors may also be used to boost minimum black levels of non-overlapped regions to match the minimum black level of the overlapped region without affecting rest of the signal levels in the non-overlapped regions.

Examples of making a seamless composite image from multiple projectors are described in U.S. Pat. No. 4,974,073 entitled "Seamless Video Display," U.S. Pat. No. 5,136,390 entitled "Adjustable Multiple Image Display Smoothing Method and Apparatus," U.S. Pat. No. 6,115,022 entitled "Method and Apparatus for Adjusting Multiple Projected Raster Images and U.S. patent application Ser. No. 09/876,513 entitled "Method and Apparatus for Seamless Integration of Multiple Video Projectors" filed Jun. 6, 2001, the contents of all of which are incorporated by reference herein.

The projector technologies used for these arrayed or tiled displays have changed in the past few years from principally cathode ray tube (CRT) projectors to various formats of display engines that include Liquid Crystal Display (LCD), Image Light Amplification (ILA—Hughes/JVC), Digital Light Projection (DLP—Texas Instruments) L-Cos (Liquid Crystal on Silicon) and others, which may be referred to as digital projectors.

Digital projectors typically use some form of variable reflectivity or translucence to form images and project the images by applying a constant light source to the images having variable reflectivity or translucence. This is in contrast to CRT, which uses variable luminance of the cathode ray tube as opposed to variable reflectivity or translucence.

Maintaining all segments of a projected composite image to have the same precise color balance to create a contiguous arrayed display has been a challenge with CRT in that each red, blue and green phosphor tube typically should be carefully adjusted to behave the same on each projector. Additionally, with usage and component aging, the color balances often drift and change, thus requiring constant maintenance.

CRT projectors allow warping of images by changing the scanning path of the electron beam that is exciting the phosphors to glow. This allows adjustment of the display geometry to curves, off-axis presentation and fine tuning separate red, blue and green phosphor tubes to another, both for single full color images and for multiple images, which may include overlapping segments. However, since the CRT projectors are typically large and have three large heavy lenses for each of red, green and blue image channels, setting up and maintaining geometric alignment of multiple CRT projectors have been a daunting task. Therefore, an additional challenge with CRT arrays has been the setup and maintenance of geometric alignment of the images relative to one another.

Therefore, it is desirable to provide a digital projector that overcomes one or more challenges associated with color balancing and geometric alignment of CRT projectors, while allowing adjustment to match projection geometries.

SUMMARY

In an embodiment according to the present invention, a projection system is provided. The projection system comprises an image source, a light source and a beam splitter. The image source is used for generating a plurality of images to be projected. The light source is used for providing light to be used for projecting the images. The beam splitter is used for splitting the light from the light source to apply a corresponding portion of the light to each of the images.

In another embodiment according to the present invention, a method of projecting a plurality of images is provided. The plurality of images and light for applying to the images are generated. The light is split into light portions, and the images are projected by applying the light portions to the images.

BRIEF DESCRIPTION OF THE DRAWINGS

These and other aspects of the invention can be understood by reference to the following detailed description, taken in conjunction with the accompanying drawings, which are briefly described below.

DETAILED DESCRIPTION

In an embodiment according to the present invention, an arrayed projection system suitable for projecting multiple images in arrayed or tiled configuration is provided. The arrayed projection system in this embodiment of the present invention preferably provides simpler setup, lower maintenance, greater flexibility, and other enhanced features.

Figure 1:
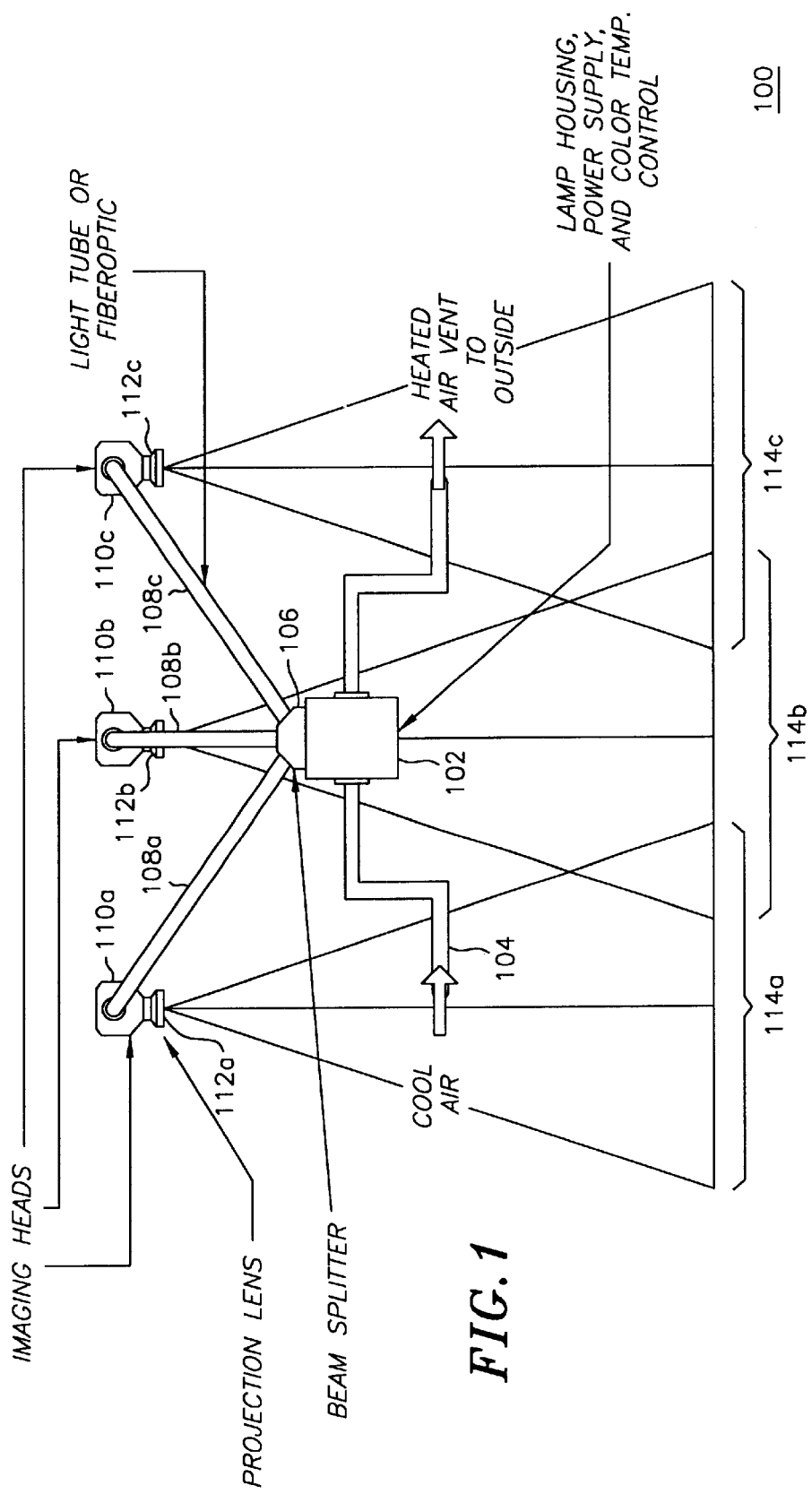
FIG. 1 is a plain view diagram of an arrayed projection system in an embodiment according to the present invention.

FIG. 1 is a plain view diagram of an arrayed projection system 100 in an embodiment according to the present invention. The arrayed projection system 100 may also be referred to as a digital projection system or a digital projector. The arrayed projection system 100 includes a lamp housing 102. The lamp housing 102 preferably includes a single light source (e.g., lamp), which preferably has high brightness. The lamp housing 102 may also include a power supply and color temperature control.

The arrayed projection system 100 preferably also includes a cooling system 104 for the lamp housing. The cooling system 104 preferably receives cool air, cools the lamp housing 102, and outputs heated air through a vent. The arrayed projection system 100 preferably also includes a beam splitter 106 for splitting the light from the light source in the lamp housing 102 into two or more parts, each of which may be referred to as a light channel or a light portion. For splitting this light, any commercially available beam splitter or any other suitable method and apparatus known to those skilled in the art may be used.

The arrayed projection system 100 preferably also includes two or more light guides 108a, 108b, 108c, which may include any commercially available light tubes, fiber optic cables or any other suitable apparatus and methods for guiding the light channels known to those skilled in the art. The light guides 108a, 108b and 108c preferably are used to send the light channels, respectively, to corresponding projection image heads 110a, 110b and 110c, which may also be referred to as imaging heads.

Each imaging head may comprise a digital projector (without light source) such as, for example, liquid crystal display (LCD), image light amplification (ILA), digital light projection (DLP) or liquid crystal on silicon (L-Cos). It should be noted that, even though the imaging heads 108a, 108b and 108c may not include power supplies or light sources typical to conventional projectors, they may still be referred to as projectors, digital projectors or as any other term used by those skilled in the art to refer to a projection device.

The arrayed projection system 100 may be coupled to an image source (not shown) for generating the images to be projected. The image source may comprise a computer, a specialty camera and/or specially prepared media, and may generate multiple partially overlapped images for creation of a projected composite image. In other embodiments, each imaging head 110a, 110b or 110c may receive input from a separate image source. In still other embodiments, one or more imaging heads 110a, 110b and 110c may include an internal image source.

The imaging heads 110a, 110b and 110c preferably include projection lenses 112a, 112b and 112c, respectively. Each projection lens, for example, preferably functions as an optical system for the corresponding imaging head to meet the display geometry requirements.

The arrayed projection system 100 as shown in FIG. 1 only has three light guides, three imaging heads and three projection lenses for illustrative purposes only. Those skilled in the art, of course, would appreciate that the present invention may actually include different quantity of each of these components as well as other components not shown in FIG. 1.

The imaging heads preferably have reduced size and weight compared to a conventional digital projector having an internal light source, and preferably are arrayed in an overlap or adjacent geometry. For example in FIG. 1, projected images 114a, 114b and 114c from the imaging heads 110a, 110b and 110c, respectively, are overlapped with one another. Further, the imaging heads may not include their own power supplies for internal electronics, with power being supplied by a common power supply located at the lamp housing. For example, each imaging head may only include a small electronics package, including the imaging chips, light valves or LCDs and lens protruding into the work environment.

Figure 2:
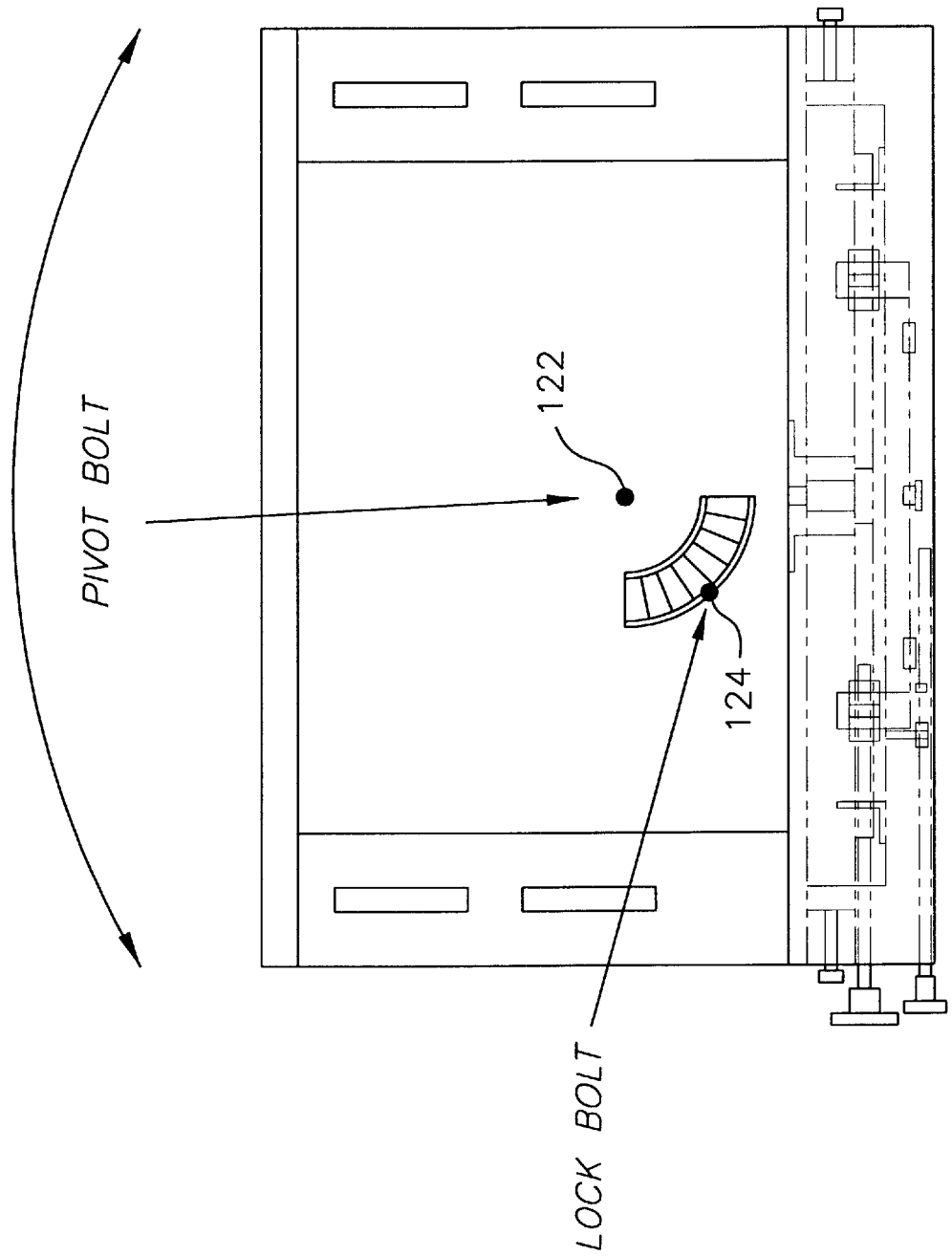
FIG. 2 illustrates a side view of an imaging head similar to the one used in the arrayed projection system of FIG. 1.
Figure 3:
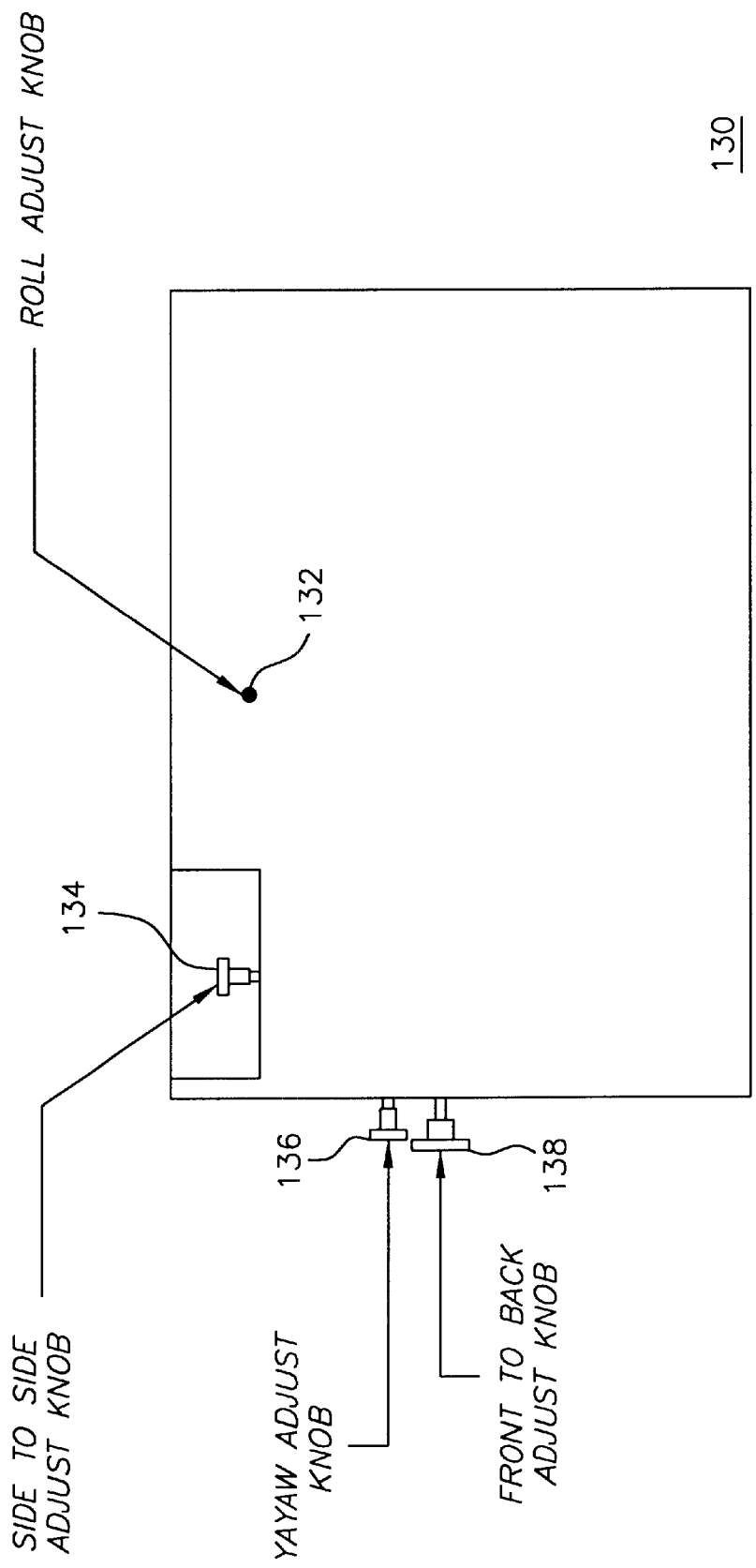
FIG. 3 illustrates a bottom view of an imaging head similar to the one used in the arrayed projection system of FIG. 1.

Due to smaller size and weight of the imaging heads, it may be easier to design a mechanical alignment system to quickly and easily adjust the projection geometry of each array element. Once aligned, only severe mechanical interference preferably would alter the display geometry. For example, for suitable alignment of the imaging heads for various different applications, each imaging head preferably includes a mechanical alignment system, an example of which is illustrated in FIGS. 2 and 3. FIG. 2 illustrates a side view 120 of an imaging head, which may be similar to the imaging head 110a, 110b or 110c of FIG. 1. As can been seen in FIG. 2, the imaging head includes a pivotal bolt 122 for rotatably adjusting the imaging head and a lock bolt for fixing the configuration at a particular rotation.

FIG. 3 illustrates a bottom view 130 of an imaging head, which may be similar to the imaging head 110a, 110b or 110c of FIG. 1. As can be seen in the bottom view 130, the imaging head includes a roll adjust knob 132 for adjusting roll of the imaging head, a side-to-side adjust knob 134 for sideways translational adjustment of the imaging head, a yaw adjust knob 136 for adjusting yaw of the imaging head, and a front-to-back adjust knob 138 for front-and-back translational adjustment of the imaging head. Of course, other adjustment knobs and bolts may be available for imaging head alignment in other embodiments.

Returning now to FIG. 1, by using a single light source (e.g., a high brightness lamp) in the common lamp housing 102 and sending portions of the light to the imaging heads 110a, 110b and 110c, respectively, the challenge associated with color balance maintenance (or colorimetry) may be reduced or eliminated. Once the color reproduction characteristics of each imaging head in an array has been matched during the setup of the system, the effects of aging (e.g., changes in color temperature) and changes in brightness from use of the display preferably is evenly propagated to each of the imaging heads 110a, 110b and 110c.

Although the accuracy of the color temperature relative to accurate reproduction of the source images preferably is controlled at the lamp housing using the color temperature control, the relative color of each imaging head preferably is constant and preferably does not require additional maintenance as the lamp ages or when replaced with a new one. Thus, using this method, the relative color of each imaging head preferably tracks with the overall color temperature changes of the single light source in the lamp housing 102.

Use of a single lamp housing (including the light source) in an arrayed display device preferably also provides an ability to remotely control that lamp housing. In other words, for example, the lamp housing (including power supplies) may be located above a drop ceiling of a standard office facility, thus creating less intrusion into the actual workspace, reducing the fan noise of the projection device, and allowing for direct venting of substantial heat generated by the light source (e.g., lamp).

Figure 4:
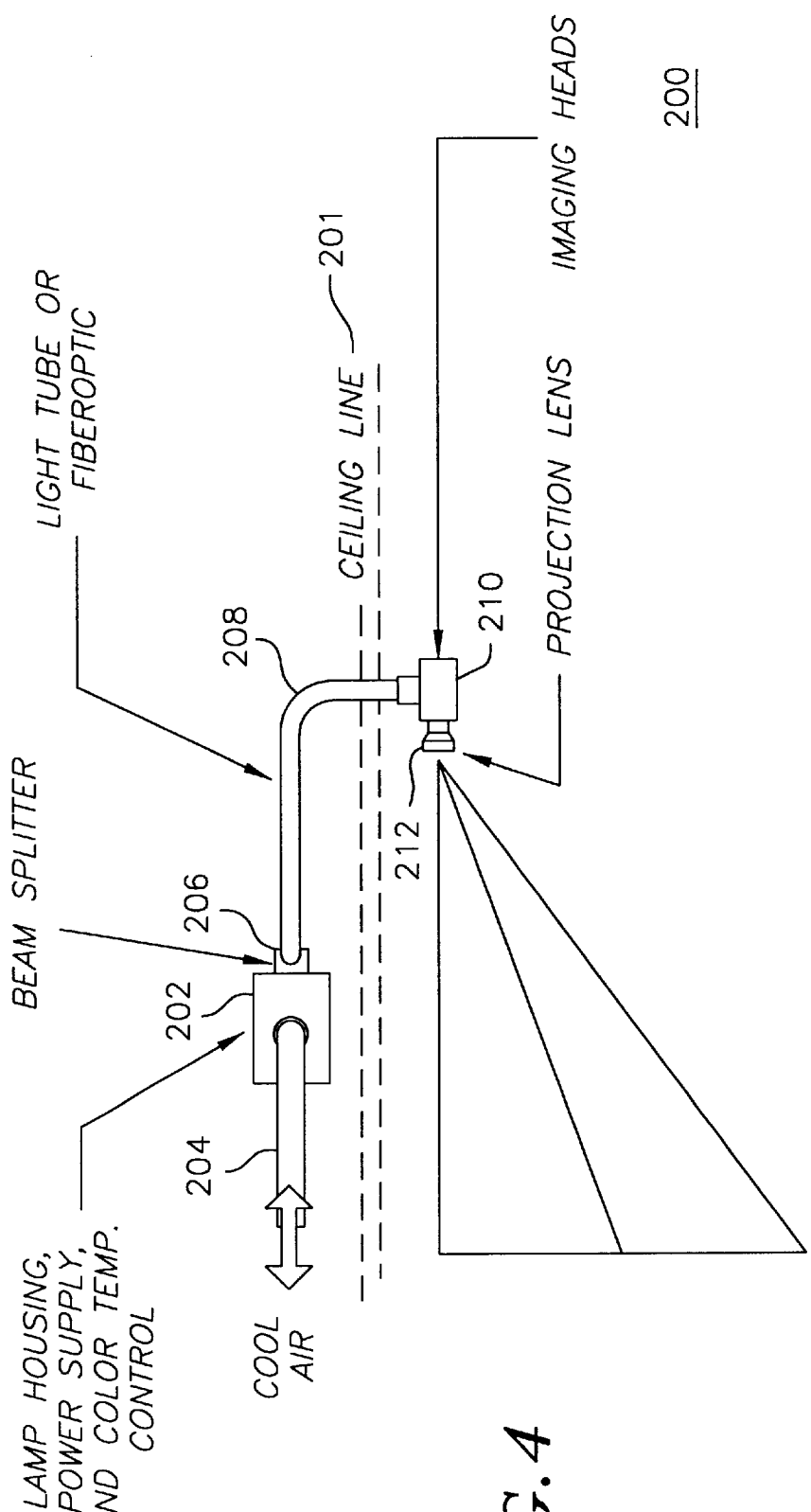
FIG. 4 illustrates a sectional view of a digital projector mounted on a ceiling.

For example, FIG. 4 illustrates a sectional view of a digital projector 200 mounted on a ceiling. The digital projector 200 comprises a lamp housing 202, a cooling system 204, a beam splitter 206, a light guide 208, an imaging head 210 and a projection lens 212. The lamp housing 202 preferably includes a high brightness light source, and may also include a power supply and color temperature control.

The digital projector 200 as shown only includes a single light guide 208 and a single imaging head 210. However, the digital projector 200 preferably also includes additional light guides and imaging heads (not shown). For example, the digital projector 200 may be similar to the arrayed projection system 100 of FIG. 1 except that bulk of the components are installed above a ceiling line 201. For example, the lamp housing 202, the cooling system 204, the beam splitter 206, and a major portion of the light guide 208 are disposed above the ceiling line 201 in FIG. 4, while the imaging head 210 and the projection lens 212 are disposed below the ceiling line 201.

When the digital projector 200 includes multiple light guides and imaging heads, the beam splitter 206 coupled to the lamp housing 202 preferably sends multiple light channels or light portions to the imaging heads (including the imaging head 210), e.g., via the light guides (including the light guide 208). The requisite technologies to accomplish distribution of light are well known to those skilled in the art, and a number of commercially available beam splitters, light tubes and/or fiber optic cables may be used for this light distribution.

Figure 5:
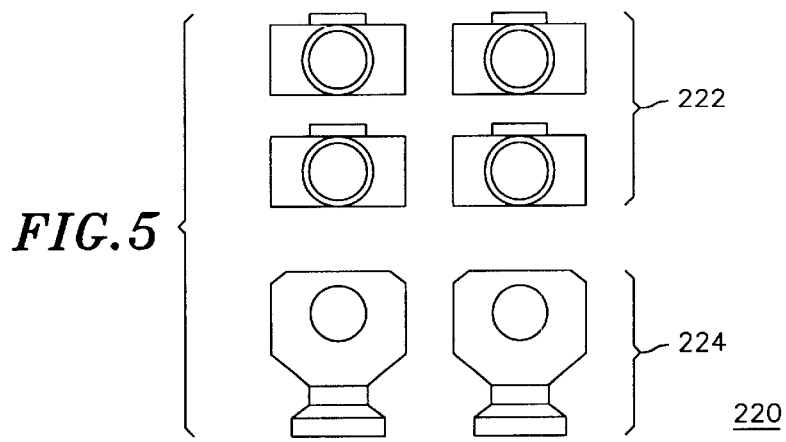
FIG. 5 illustrates 2×2 array configuration of imaging heads.
Figure 6:
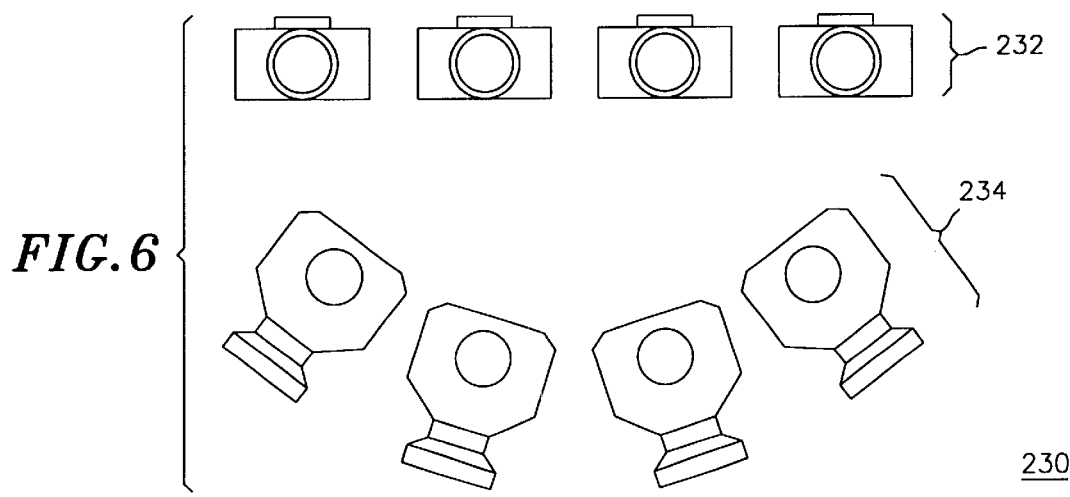
FIG. 6 illustrates a narrow angle array configuration of imaging heads.
Figure 7:
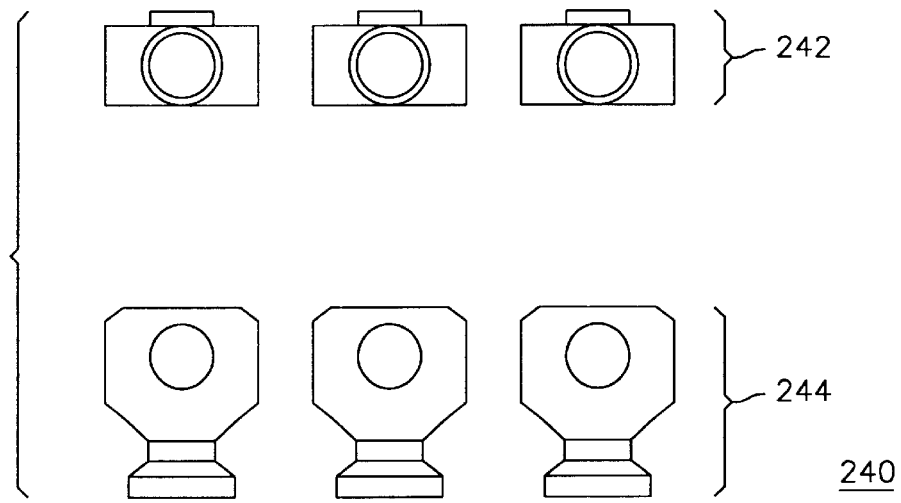
FIG. 7 illustrates a same image plane array configuration of imaging heads.
Figure 8:
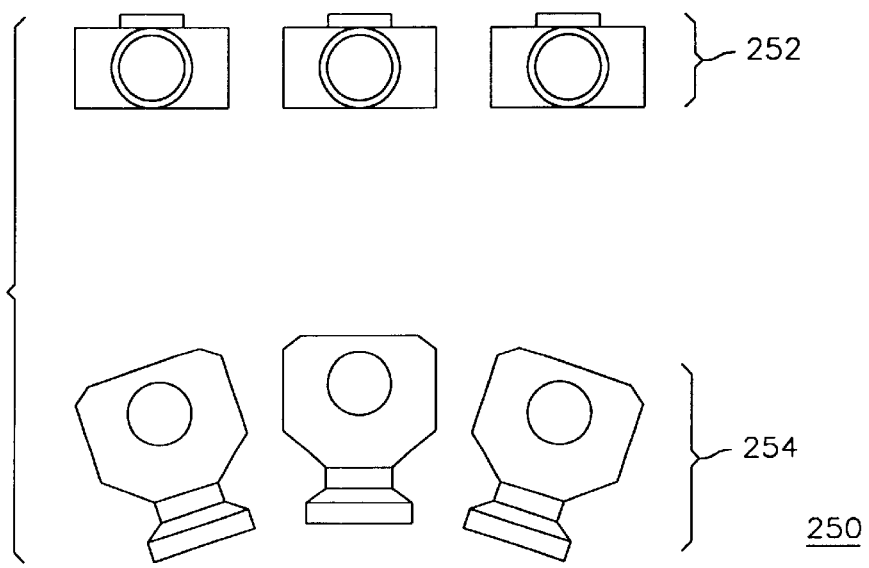
FIG. 8 illustrates a wide angle array configuration of imaging heads.

Small size and weight of the imaging heads may afford increased flexibility in organizing groups of imaging heads into useful geometries as illustrated in FIGS. 5, 6, 7 and 8. FIG. 5 illustrates a front view 222 and a top view 224 of four imaging heads arrayed in a 2×2 configuration. FIG. 6 illustrates a front view 232 and a top view 234 of four imaging heads arrayed in a single row, narrow angle configuration. FIG. 7 illustrates a front view 242 and a top view 244 of three imaging heads arrayed in a single row, same image plane configuration. FIG. 8 illustrates a front view 252 and a top view 254 of three imaging heads arrayed in a single row, wide angle configuration. The imaging heads having narrow and wide angle configurations may be particularly useful when projecting images onto a curved screen.

The imaging heads in various different embodiments of the present invention may be compatible with a number of specialty lenses and optical systems that should allow the arraying of images to various geometries such as flat displays, cylindrical displays and compound curve displays, whether front projected, rear projected or using folded light paths. An example of this would be a lens for a cylindrical display as illustrated in FIG. 9.

Figure 9:
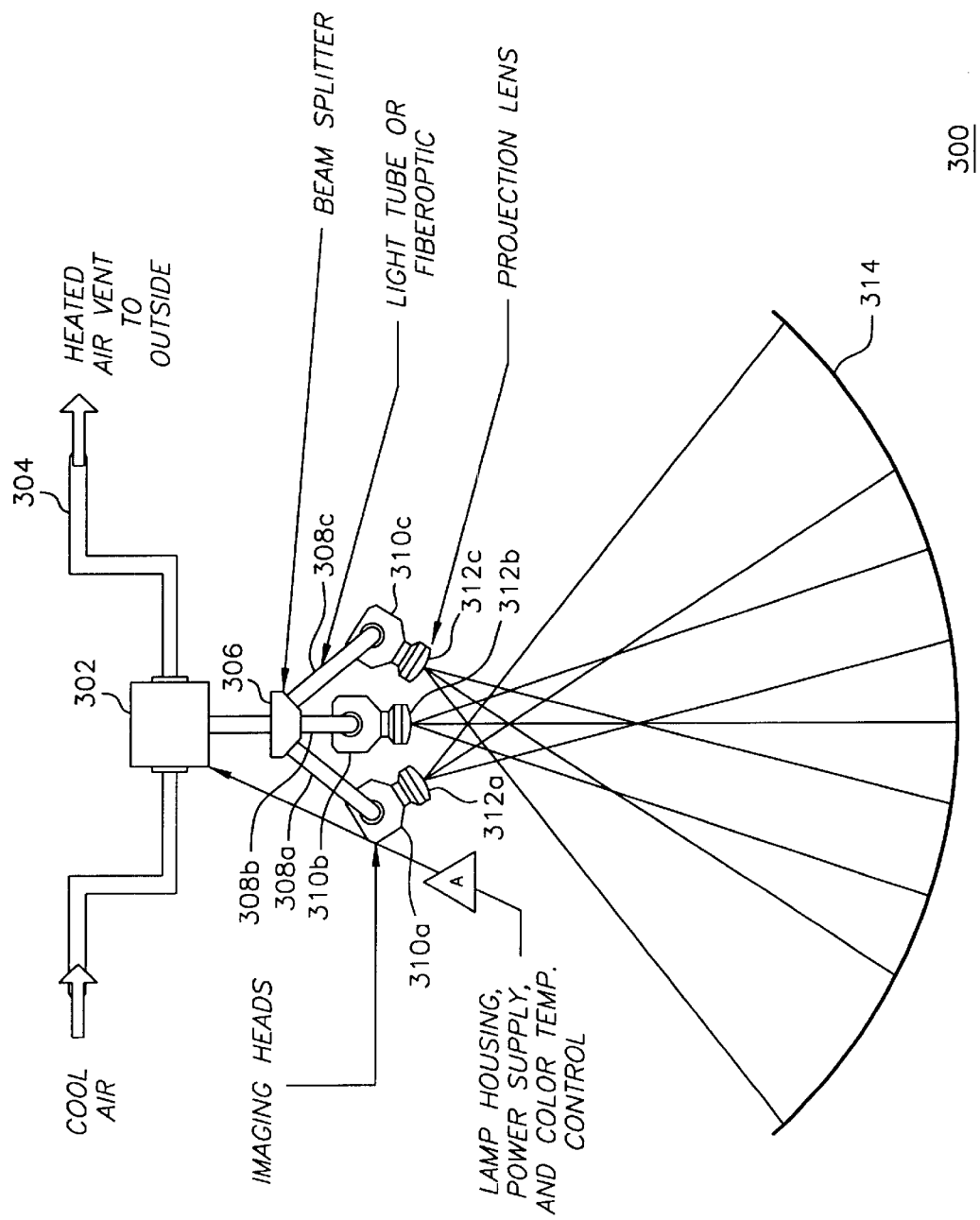
FIG. 9 illustrates a plain view of an arrayed projection system in an embodiment according to the present invention.

FIG. 9 illustrates an arrayed projection system 300 in an embodiment according to the present invention. The arrayed projection system 300 may also be referred to as a digital projector or as a digital projection system. The arrayed projection system 300 includes a lamp housing 302. The lamp housing 302 preferably includes a single high brightness light source. The lamp housing 302 may also include a power supply and color temperature control.

The arrayed projection system 300 preferably also includes a cooling system 304 for the lamp housing. The cooling system 304 preferably receives cool air, cools the lamp housing 302, and outputs heated air through a vent. The arrayed projection system 300 preferably also includes a beam splitter 306 for splitting the light from the light source in the lamp housing 302 into two or more parts, each of which may be referred to as a light channel or a light portion. For splitting this light, any commercially available beam splitter or any other suitable method and apparatus known to those skilled in the art may be used.

The arrayed projection system 300 preferably also includes two or more light guides 308a, 308b, 308c, which may include any commercially available light tubes, fiber optic cables or any other suitable apparatus and methods for guiding the light channels known to those skilled in the art. The light guides 308a, 308b and 308c preferably are used to send the light channels, respectively, to corresponding projection image heads 310a, 310b and 310c, which may also be referred to as an imaging head.

Each imaging head preferably includes a projection lens 312a, 312b or 312c. Each projection lens, for example, functions as an optical system for the corresponding imaging head to match the requirements of the display geometry, in this case, a cylindrical geometry. The arrayed projection system 300 shown in FIG. 9 includes three light guides, three imaging heads and three projection lenses for illustrative purposes only. Those skilled in the art, of course, would appreciate that the present invention may actually include different quantity of each of these components.

Figure 10:
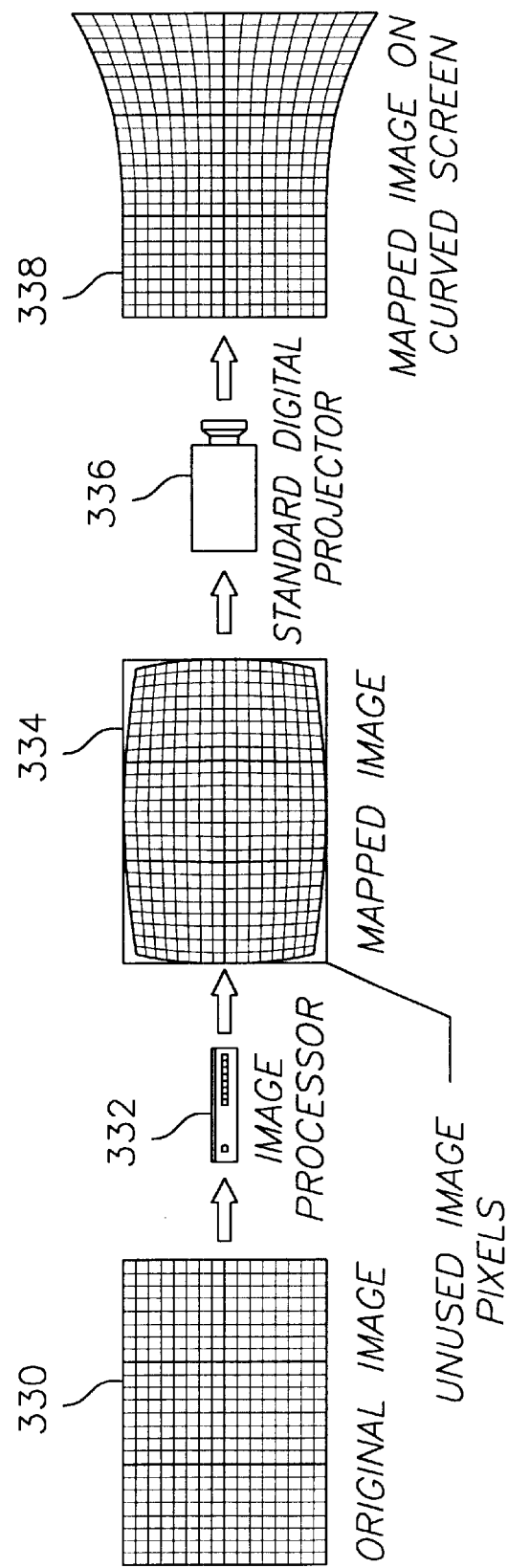
FIG. 10 illustrates an electronic image warping in an embodiment according to the present invention.

Unlike CRT projectors where the raster of the image can be warped to match the desired projection geometries, even for cylinders and compound curves, most current digital imagining projection technologies are based on fixed grid geometries. FIG. 10 illustrates one method that may be used to overcome this limitation for digital projectors, in which an electronic image warping or image mapping is used. In this application, the fixed geometry projection 330 preferably is distorted by an image processor 332 based on the projection geometry. The image processor 332 preferably then re-maps the image on the raster to create the desired geometrical result 334. The mapped image 334 is then projected by a digital projector 336, for example, on a curved screen 338.

The electronic image warping, for example, may be used with the arrayed projection system 300 of FIG. 9, instead of or in addition to the special lenses 312a, 312b and 312c, to match the cylindrical projection geometry. When this approach is used however, during the re-mapping, some available pixels of information may be discarded or thrown away because they do not fall into the desired geometry.

Figure 11:
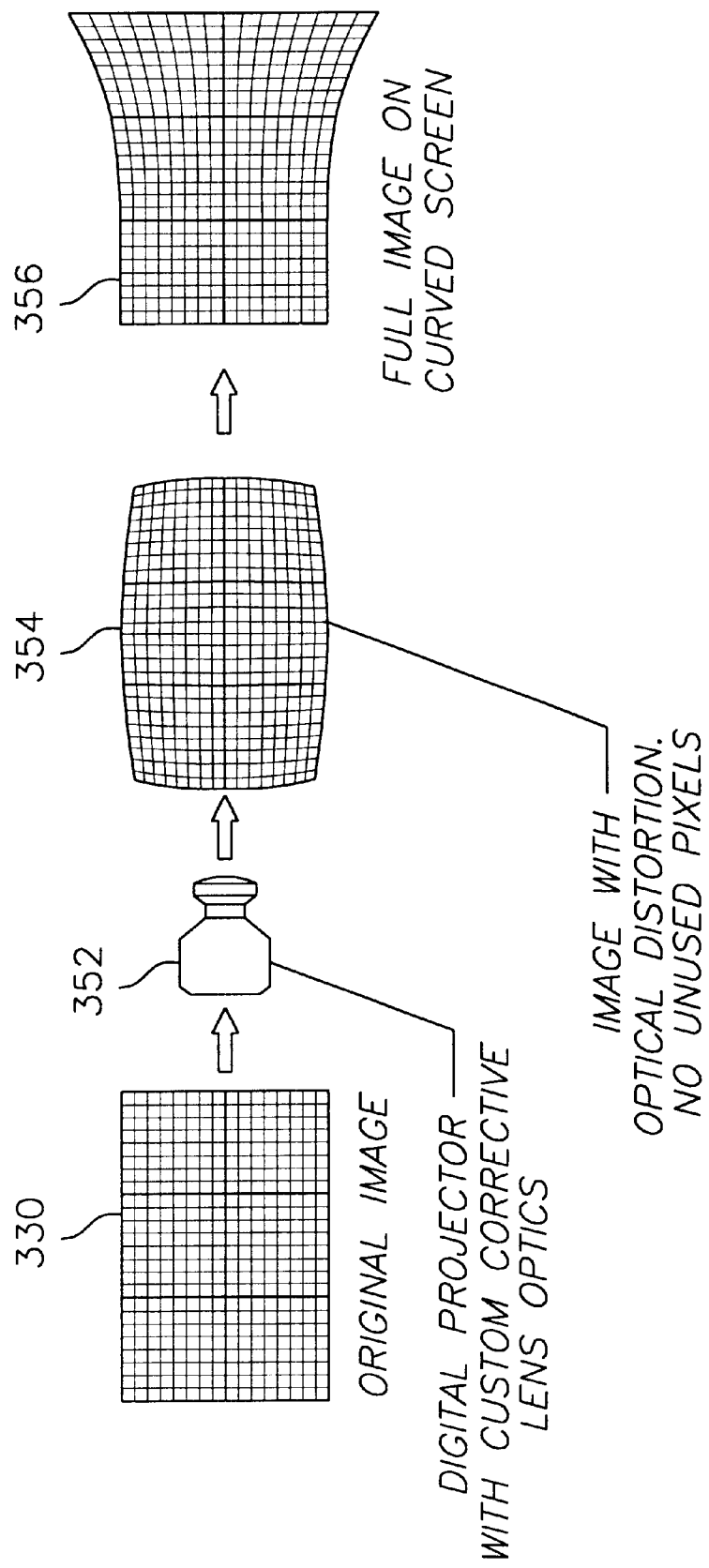
FIG. 11 illustrates an optical image warping using a special lens in an embodiment according to the present invention.

The image distortion may also be achieved using an optical lensing solution that is designed specifically for the desired geometry, such as in the arrayed projection system 300 of FIG. 9. For example, in FIG. 11, the projection image 330 preferably is projected by a digital projector having corrective lens optics 352 to generate an image 354 with optical distortion. Then the distorted image may be projected onto a curved screen 356. All pixels can be used to render the image in this case.

Accordingly, the present invention provides an improved projection system for arrayed or tiled display. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

We claim:

1. A projection system comprising:
   an image source for generating a plurality of images to be projected;
   a single light source for providing light to be used for projecting the images; and
   a beam splitter for splitting the light from the single light source to apply a corresponding portion of the light to each of the images,
   wherein at least two of the projected images are partially overlapped with each other and edge blended to form a composite image,
   thereby eliminating colorimetry problems associated with edge blending multiple projected images generated using multiple independent light sources.

2. The projection system according to claim 1, the projection system further comprising:
   a plurality of light guides, each light guide being associated with one of the plurality of images,
   wherein each image receives the corresponding portion of the light via the associated light guide.

3. The projection system according to claim 2, wherein the light guides comprise a plurality of light tubes.

4. The projection system according to claim 2, wherein the light guides comprise a plurality of fiber optic cables.

5. The projection system according to claim 2, the projection system further comprising:
   a plurality of imaging heads, each imaging head being associated with one of the light guides and receiving the image associated with the associated light guide from the image source;
   wherein each imaging head receives the corresponding portion of the light via the associated light guide, and wherein the corresponding light portion is applied to the associated image in the imaging head for image projection.

6. The projection system according to claim 5, wherein each imaging head comprises a projection lens via which the associated image is projected.

7. The projection system according to claim 5, wherein the light source and the beam splitter are mounted above a ceiling of a room, the imaging heads are mounted below the ceiling of said room, and the light guides guide the light portions from the beam splitter above the ceiling to the imaging heads below the ceiling through the ceiling.

8. The projection system according to claim 5, wherein the location and orientation of the imaging heads with respect to the imaging source are adjustable.

9. The projection system according to claim 1, wherein the imaging source comprises one selected from the group consisting of a computer, a specialty camera and a multi-channel image generator.

10. The projection system according to claim 1, wherein each imaging head comprises a digital projector.

11. The projection system according to claim 10, wherein at least one imaging head comprises the digital projector selected from the group consisting of liquid crystal display (LCD), image light amplification (ILA), digital light projection (DLP) and liquid crystal on silicon (L-Cos).

12. The projection system according to claim 1, wherein the projected images are arrayed in a single row to form the composite image.

13. The projection system according to claim 1, wherein the projected images are arrayed in multiple rows to form the composite image.

14. The projection system according to claim 1, wherein the image source comprises:
   an array of smoothing factors, each smoothing factor being associated with a portion of the composite image; and
   means for applying the smoothing factors to video signals representing the images to remove projection defects resulting from display of the images.

15. The projection system according to claim 14, wherein the projection defects comprise differences in maximum bright levels between overlapped and non-overlapped regions of the composite image.

16. The projection system according to claim 15, wherein the applying means comprises means for edge blending of adjacent overlapping projected images.

17. The projection system according to claim 16, wherein the projection defects further comprise differences in minimum black levels between the overlapped and non-overlapped regions of the composite image.

18. The projection system according to claim 17, wherein the applying means further comprises means for boosting the minimum black levels of the non-overlapped regions to match the minimum black level of the overlapped region without affecting rest of the signal levels in the non-overlapped regions.

19. The projection system according to claim 1, wherein the images are warped to match projection geometries.

20. The projection system according to claim 19, wherein the projection geometries includes one selected from the group consisting of a cylinder and a compound curved surface.

21. The projection system according to claim 19, wherein the images are warped electronically.

22. The projection system according to claim 19, wherein the images are warped optically.

23. A method of projecting a plurality of images, the method comprising the steps of:

generating the plurality of images;

generating a single light to be applied to the images;

splitting the single light into light portions;

projecting the images by applying the light portions to the images, at least two of the projected images being partially overlapped with each other; and edge blending the overlapped images to reduce an appearance of a seam in an overlap between the images.

24. The method of projecting according to claim 23, wherein the projected images are arrayed in a single row to form the composite image.

25. The method of projecting according to claim 23, wherein the projected images are arrayed in multiple rows to form the composite image.

26. The method of projecting according to claim 23, the method further comprising the step of adjusting video signals representing the images to raise minimum black levels of non-overlapped regions of the images, without affecting rest of the video signals, to match a minimum black level of the overlap.

27. The method of projecting according to claim 26, wherein the step of edge blending comprises the steps of generating a plurality of smoothing factors, and applying the smoothing factors to the video signals.

28. The method of projecting according to claim 26, wherein the step of adjusting comprises the steps of generating correction factors, and applying the correction factors to the video signals to raise the minimum black levels of the non-overlapped regions without affecting rest of the video signals.

29. The method of projecting according to claim 23, further comprising the step of electronically warping the images prior to projecting to match projection geometries.

30. The method of projecting according to claim 23, further comprising the step of optically warping the images prior to projecting to match projection geometries.

* * * * *